United States Patent [19]

Takefuta

[11] Patent Number: 5,295,923
[45] Date of Patent: Mar. 22, 1994

[54] LUBRICATION MODIFICATION FOR PARALLEL-AXIS DIFFERENTIAL

[75] Inventor: Hideyasu Takefuta, Higashimatsuyama, Japan

[73] Assignee: Zexel-Gleason USA, Inc., Rochester, N.Y.

[21] Appl. No.: 977,648

[22] Filed: Nov. 17, 1992

[51] Int. Cl.$^5$ .............................................. F16H 1/42
[52] U.S. Cl. ..................................... 475/252; 475/160
[58] Field of Search ......................... 475/159, 160, 252

[56] References Cited

U.S. PATENT DOCUMENTS

| | | | |
|---|---|---|---|
| 2,269,734 | 1/1942 | Powell | 475/252 |
| 2,789,446 | 4/1957 | Schoenrock | 475/252 X |
| 3,251,244 | 5/1966 | Nickell | 475/252 X |
| 3,406,593 | 10/1968 | Vesey | 475/252 X |
| 3,706,239 | 12/1972 | Myers | 475/226 |
| 3,738,192 | 6/1973 | Belansky | 475/249 |
| 4,365,524 | 12/1982 | Dissett et al. | 475/226 |
| 5,122,101 | 6/1992 | Tseng | 475/252 |

*Primary Examiner*—Dirk Wright
*Attorney, Agent, or Firm*—Eugene Stephens & Associates

[57] ABSTRACT

A parallel-axis gear differential includes pairs of element gears (34) mounted within pockets (36) formed in a differential housing (10). Each element gear includes a first gear section (38) for meshing with one of two side gears (30 or 32), a second gear section (40) for meshing with the first gear section of its mating element gear, and a stem section (42) for interconnecting the first two gear sections. Associated with each pair of pockets are two passageways (44, 46) for providing respective paths for the flow of lubrication fluid between the exterior of the housing and the respective meshing gear sections (38, 40) of each pair of element gears (34). Further, the shape of each pair of pockets (36) is modified between its apron portions (a) and its opening (b) to increase the space between the pocket and the mating surfaces of the element gears. This increased space at the pocket opening allows a greater volume of lubricating fluid to be moved by the rotating teeth of element gears, reducing the fluid pressure between the interior portion of the pockets and the surface of the element gears, and thereby increasing the flow of lubricating fluid to facilitate lubrication.

3 Claims, 2 Drawing Sheets

{5,295,923}

LUBRICATION MODIFICATION FOR PARALLEL-AXIS DIFFERENTIAL

TECHNICAL FIELD

The invention relates to automotive differentials of the "parallel-axis" type, and, more particularly, to the lubrication of the differential's planetary gear arrangements that are mounted in pockets formed in the differential housing.

BACKGROUND

Gear differentials include compound planetary gear sets carried within a differential housing interconnecting a pair of output shafts for opposite directions of rotation with respect to the housing. An input shaft is connected to the housing for rotating the housing about a common axis of the output shafts. Sun gear members of the respective planetary gear sets, also referred to as "side" gears, are coupled to inner ends of the output shafts. Planet gear members of the planetary gear sets, also referred to as "element" gears, operatively connect the two side gears for relative rotation in a mutual driving relationship.

One known arrangement of the planetary gearing positions the side and element gears within the housing for rotation about axes that extend parallel to each other. Differentials with this type of gearing arrangement are referred to as "parallel-axis" gear differentials. The element gears of this type of differential are generally mounted in pairs within the differential housing. Preferably, the element and side gears are provided with helical teeth; and one portion of each element gear meshes with one of the side gears, while another portion of each element gear meshes with its paired element gear.

The invention herein relates to known designs of parallel-axis differentials in which the element gears are individually supported for rotation within pockets formed in the housings. The element-gear pockets have a predetermined shape with (a) an interior portion for mating with and providing bearings for slidably supporting the outside cylindrical surfaces of the element gears; (b) an opening providing clearance for the meshing engagement of each respective element gear with its respective side gear; and (c) an apron portion, adjacent the opening, demarcating the outer extremity of the bearing surface necessary to support the element gears so that their position remains appropriately fixed under outward thrust conditions. While such pocket designs have many important advantages, the relatively tight tolerances between the element-gear pockets and the outer cylindrical surfaces of the element gears make lubrication of these mating surfaces quite difficult.

SUMMARY OF INVENTION

This invention is related to a second invention disclosed in a commonly-assigned U.S. patent application Ser. No. 07/977,651, entitled "Parallel-Axis Differential Gear Modification" filed in the name of Hideyuki Sato on even date herewith, the disclosure of which is hereby incorporated by reference. Both inventions improve parallel-axis gear differentials by facilitating the flow of lubricating oil between the element gears and their respective pockets.

My invention accomplishes such lubrication improvement by providing a simple modification to the shape of the element-gear pockets. According to the invention, the shape of each pair of pockets is modified between its apron portions and its opening to increase the space between the pocket and the mating surfaces of the element gears, thereby providing greater volume for the flow of lubricating fluid from the passageway and reducing its back pressure to improve lubrication.

In a preferred embodiment of the invention, the differential housing is provided with passageways between the exterior of the housing and each pair of pockets for providing a path for lubricating fluid. One such passageway is positioned in proximity to each of the meshing areas shared by each pair of element gears.

DRAWINGS

FIG. 3A is a schematic view of a pair of element-gear pockets formed in a known manner, while

DETAILED DESCRIPTION

Figure 1:
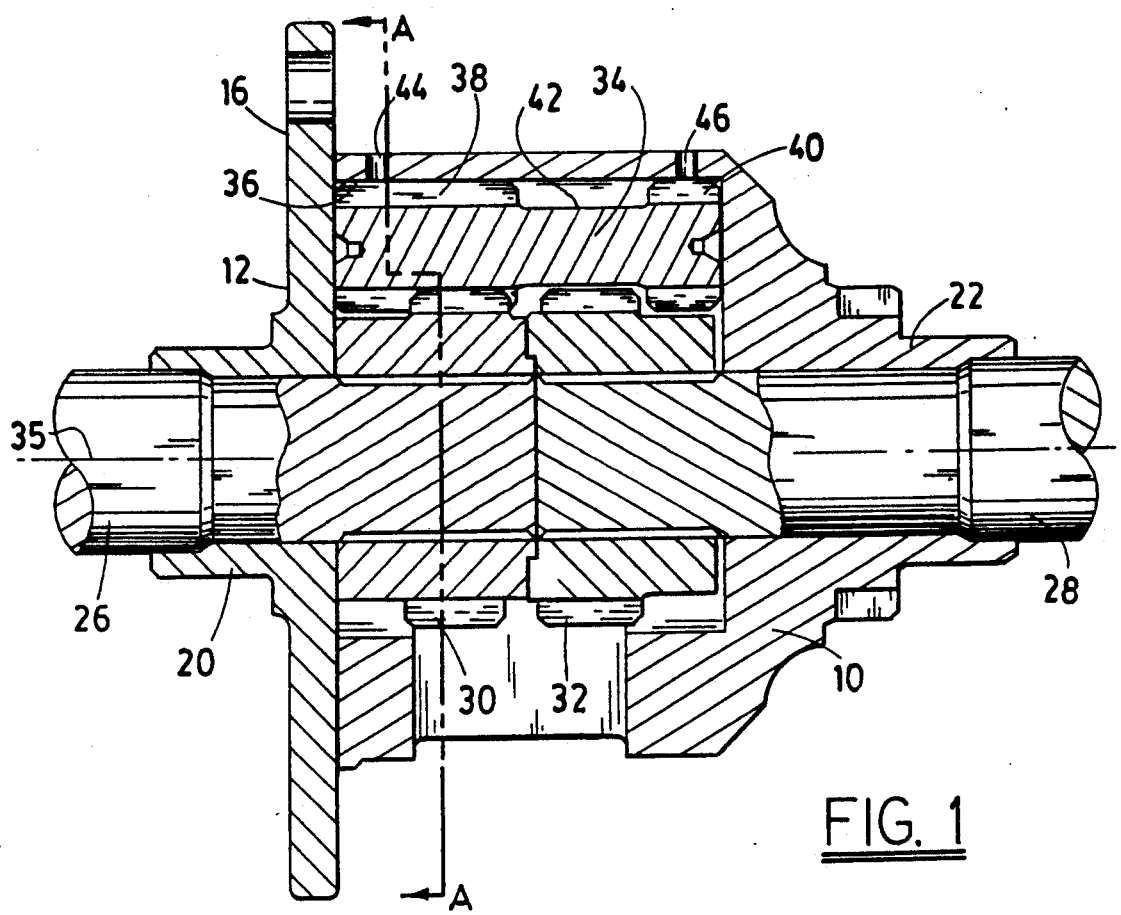
FIG. 1 is a longitudinal sectional view of a parallel-axis gear differential modified according to a preferred embodiment of my invention.
Figure 2:
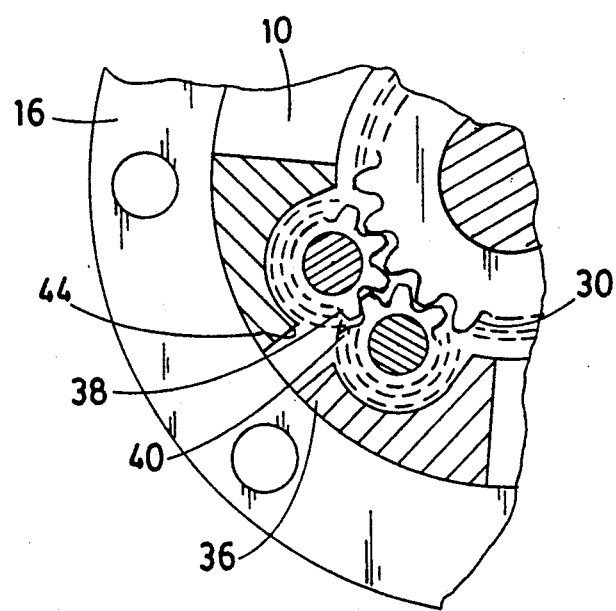
FIG. 2 is a schematic partial sectional view of the housing shown in FIG. 1, taken along the plane A—A, showing a pair of element gears in mesh with each other and showing one of the element gears in mesh with a respective one of the side gears.

In the preferred embodiment illustrated in FIGS. 1 and 2, my differential is assembled from two housing portions 10 and 12 that are held together by bolts. A flange 16 is formed integrally with housing portion 12 for mounting a ring gear (not shown). Bearings are mounted within respective trunnions 20 and 22 to support the housing for rotation about axle shafts 26 and 28.

A planetary gear arrangement is carried in housing 10, namely, side gears 30 and 32 are splined to the respective inner ends of axle shafts 26 and 28 for rotation about a common axis 35. Element gears 34 are mounted in respective pairs of pockets 36 that are evenly distributed about the periphery of the side gears. Each element gear 34 is positioned for rotation about an axis parallel to common axis 35, and each includes a first gear section 38 for meshing with one of the side gears, a second gear section 40 for meshing with the first gear section 38 of its paired element gear, and a stem section 42 for interconnecting the two gear sections 38 and 40.

A plurality of passageways 44, 46 are formed through housing portion 10 to provide respective paths for the flow of lubrication fluid between the exterior of the housing and the pairs of pockets 36. Passageways 44, 46 are positioned in proximity to respective meshing gear sections 38, 40 of each pair of element gears 34.

Figure 3A:
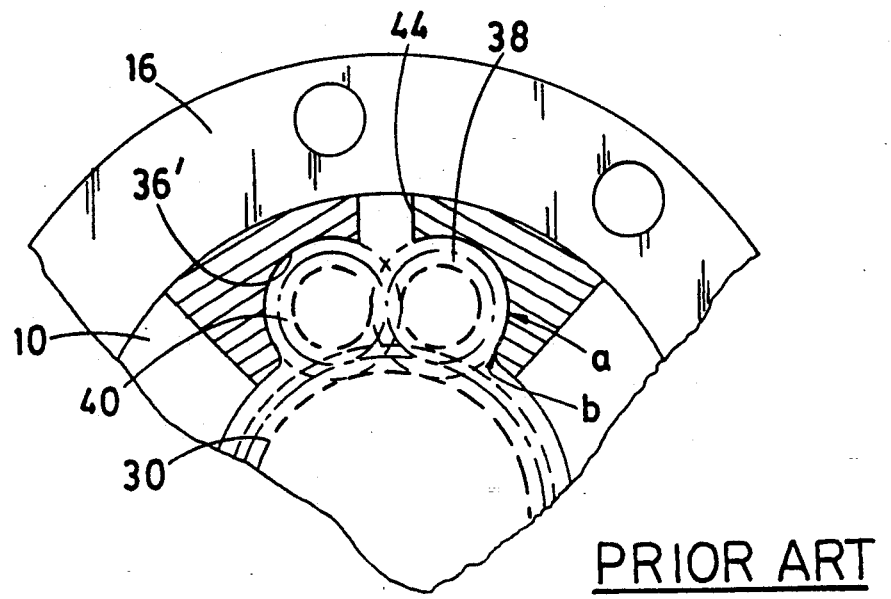
Figure 3B:
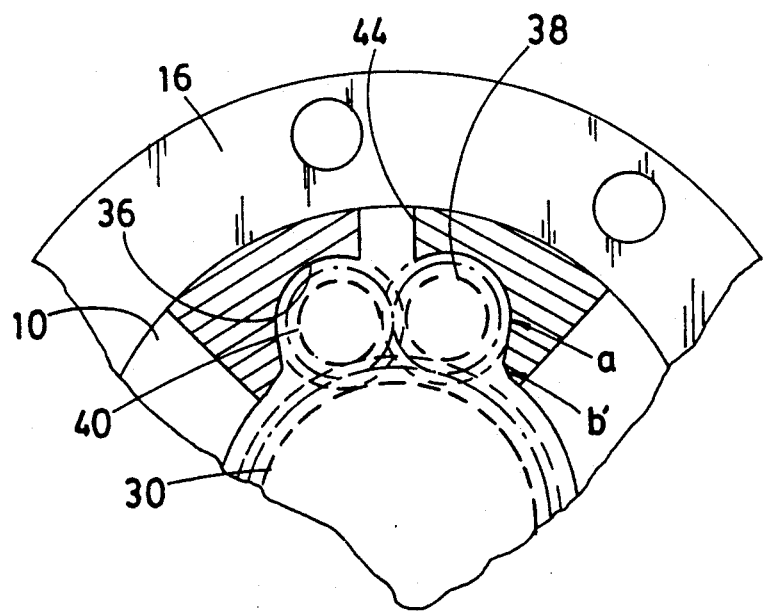
FIG. 3B is a view similar to FIG. 3A with the pockets, the design shown in FIG. 3A being an example of known prior art, while the pockets shown in FIG. 3B are modified according to the invention modified according to the invention.

FIGS. 3A and 3B provide a comparison of the invention with presently known designs, showing similar schematic views of element gears 38 and 40 supported in pockets. In both views, points a are used to identify the apron portion of the pockets, i.e., points a demarcate the outer extremity of the bearing surface necessary to support the element gears so that their position remains appropriately fixed under outward thrust conditions.

FIG. 3A shows element gears 38 and 40 supported in a presently-known pair of pockets 36'. The interior portions of pockets 36' are enclosed along their full length; and the pockets remain in close mating tolerance with the outer cylindrical surfaces of the element gears from points a, their apron portions, to the pocket opening at points b.

In contrast to the known design shown in FIG. 3A, FIG. 3B shows element gears 38 and 40 supported in a pair of element-gear pockets 36 modified in accordance with the invention. My modification includes a passageway 44 between the exterior of housing 10 and pockets 36 to provide a path for lubricating fluid. Further, while pockets 36 still retain apron portions a for assuring that the element gears remain fixed under outward thrust conditions, the shape of pockets 36 is modified between apron portions a and the opening at points b' to increase the space between the pockets and the surfaces of the element gears. This increased space at the pocket opening allows a greater volume of lubricating fluid to be moved by the rotating teeth of the element gears, reducing the fluid pressure between the interior portion of the pockets and the surface of the element gears, and thereby increasing the flow of lubricating fluid from passageway 44 and facilitating lubrication of the element gears.

I claim:

1. In a differential assembly having:

a differential housing;

a pair of side gears positioned in said housing for receiving a pair of respective axle ends for rotation therewith about a common axis;

at least one pair of element gears positioned in said housing operatively connecting said pair of side gears in a mutual driving relationship, each respective element gear in each pair being in meshing engagement with both a respective one of said side gears and with its paired element gear; and at least one pair of pockets formed in said housing supporting said element gears for rotation about respective axes that extend parallel to said common axis of said side gears, said pockets having a predetermined shape with (a) an interior portion for mating with the surfaces of said element gears, (b) an opening providing clearance for the meshing engagement of each said respective element gear with its respective one of said side gears, and (c) an apron portion, adjacent said opening, demarcating the outer extremity of the bearing surface necessary to support the element gears so that their position remains appropriately fixed under outward thrust conditions;

the improvement wherein:

the shape of each said pair of pockets is modified between said apron portion and said opening to increase the space between said pocket and said surfaces of said element gears to facilitate the flow of lubricating fluid between said interior portion of said pockets and the surface of said element gears.

2. The assembly of claim 1 wherein said housing further comprises at least one passageway between the exterior of said housing and each said pair of pockets for providing a path for lubricating fluid.

3. The assembly of claim 2 wherein each said passageway is positioned in proximity to one of the meshing areas shared by each said pair of element gears.

* * * * *